US007190950B1

(12) United States Patent
Baker et al.

(10) Patent No.: US 7,190,950 B1
(45) Date of Patent: Mar. 13, 2007

(54) STORAGE OF VOICEMAIL MESSAGES AT AN ALTERNATE STORAGE LOCATION

(75) Inventors: La Veria Baker, Atlanta, GA (US); Vernon Meadows, Atlanta, GA (US); David Scott, Norcross, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 443 days.

(21) Appl. No.: 10/184,193

(22) Filed: Jun. 27, 2002

(51) Int. Cl.
*H04M 11/10* (2006.01)
*H04M 3/42* (2006.01)
*H04L 29/08* (2006.01)

(52) U.S. Cl. ............... 455/413; 455/414.1; 455/414.2; 455/414.4; 379/1.02; 379/88.04; 379/88.07; 379/88.13; 379/88.14; 379/88.18; 379/88.26; 379/88.27; 379/93.15; 379/201.01; 379/211.02; 379/221.12; 379/908

(58) Field of Classification Search ............... 379/1.02, 379/88.04, 88.07, 88.13, 88.14, 88.18, 88.26, 379/88.27, 93.15, 201.01, 211.02, 221.12, 379/908; 455/413, 414.1, 414.2, 414.4
See application file for complete search history.

(56) References Cited

U.S. PATENT DOCUMENTS

| 5,479,491 A | 12/1995 | Herrero Garcia et al. ..... 379/88 |
| 5,680,443 A | 10/1997 | Kasday et al. ............ 379/88.13 |

(Continued)

FOREIGN PATENT DOCUMENTS

EP        1 051 018 A2    11/2000

OTHER PUBLICATIONS

U.S. Official Action dated Jan. 14, 2005 in U.S. Appl. No. 10/180,261.

(Continued)

*Primary Examiner*—Duc M. Nguyen
*Assistant Examiner*—Matthew Genack
(74) *Attorney, Agent, or Firm*—Merchant & Gould

(57) ABSTRACT

A method and system are provided for storing received voicemail messages to alternate storage locations. A subscriber to voicemail services provides a voicemail system with an address or a number of addresses to which the subscriber may forward voicemail messages for extended storage. The subscriber may provide an electronic mail address, facsimile device number, a forwarding telephone directory number, or the address of a wireless electronic device, such as a hand-held computer, personal digital assistant, or pager. After receiving and reviewing a voicemail message left for the subscriber at the voicemail system, the subscriber may select an alternate storage address to have the voicemail message forwarded to that address for extended storage and for subsequent review and use. The message may be converted from speech-to-text at the voicemail system prior to forwarding the message. If the message is converted to text format, the message may be sent to a forwarding facsimile device, or the message may be electronically mailed to an email address, Internet-based web page, or wireless electronic device. Alternatively, the message may be converted to a digital audio format and may be electronically mailed as an attachment to an electronic mail message to an address provided by the subscriber.

35 Claims, 4 Drawing Sheets

U.S. PATENT DOCUMENTS

| | | | | |
|---|---|---|---|---|
| 5,742,905 | A | 4/1998 | Pepe et al. | 455/461 |
| 5,748,709 | A | 5/1998 | Sheerin | |
| 5,797,124 | A | 8/1998 | Walsh et al. | |
| 5,884,262 | A | 3/1999 | Wise et al. | 704/270 |
| 5,892,814 | A | 4/1999 | Brisebois et al. | 379/88.24 |
| 5,963,626 | A | 10/1999 | Nabkel | 379/142 |
| 6,049,796 | A | 4/2000 | Siitonen et al. | 707/3 |
| 6,078,650 | A | 6/2000 | Hansen | 379/52 |
| 6,091,947 | A * | 7/2000 | Sumner | 455/413 |
| 6,097,941 | A * | 8/2000 | Helferich | 455/412.1 |
| 6,122,348 | A | 9/2000 | French-St. George et al. | 379/88.23 |
| 6,125,376 | A | 9/2000 | Klarlund et al. | 707/513 |
| 6,181,780 | B1 * | 1/2001 | Finnigan | 379/67.1 |
| 6,181,781 | B1 | 1/2001 | Porter et al. | 379/88.17 |
| 6,226,362 | B1 | 5/2001 | Gerszberg et al. | 379/88.13 |
| 6,233,318 | B1 | 5/2001 | Picard et al. | 379/88.17 |
| 6,285,984 | B1 | 9/2001 | Speicher | 705/14 |
| 6,292,480 | B1 | 9/2001 | May | 370/352 |
| 6,301,608 | B1 | 10/2001 | Rochkind | 709/206 |
| 6,332,020 | B1 | 12/2001 | Mitchell et al. | 379/93.25 |
| 6,351,523 | B1 | 2/2002 | Detlef | 379/88.14 |
| 6,374,223 | B1 | 4/2002 | Donaldson et al. | 704/260 |
| 6,368,205 | B1 | 9/2002 | Frank | 453/413 |
| 6,446,114 | B1 | 9/2002 | Bulfer et al. | 709/206 |
| 6,459,774 | B1 | 10/2002 | Ball et al. | 379/67.1 |
| 6,459,785 | B1 | 10/2002 | Naumburger | |
| 6,487,277 | B2 | 11/2002 | Beyda et al. | 379/88.01 |
| 6,519,327 | B1 | 2/2003 | Cannon et al. | 379/88.22 |
| 6,522,727 | B1 * | 2/2003 | Jones | 379/88.23 |
| 6,522,879 | B2 | 2/2003 | Myer et al. | 455/426.1 |
| 6,529,586 | B1 | 3/2003 | Elvins et al. | 379/88.13 |
| 6,539,080 | B1 | 3/2003 | Bruce et al. | 379/88.17 |
| 6,621,892 | B1 | 9/2003 | Banister et al. | 379/88.14 |
| 6,683,940 | B2 | 1/2004 | Contractor | |
| 6,697,459 | B2 * | 2/2004 | Finnigan | 379/88.18 |
| 6,718,015 | B1 | 4/2004 | Berstis | 379/88.17 |
| 6,721,397 | B1 | 4/2004 | Lu | 379/88.11 |
| 6,728,934 | B1 | 4/2004 | Scopes | 715/513 |
| 6,744,867 | B1 * | 6/2004 | Chin et al. | 379/142.01 |
| 6,795,530 | B1 | 9/2004 | Gilbert et al. | 379/76 |
| 6,801,763 | B2 | 10/2004 | Elsey et al. | 455/404.1 |
| 6,807,257 | B1 | 10/2004 | Kurganov | |
| 6,829,334 | B1 | 12/2004 | Zirngibl et al. | 379/88.17 |
| 6,888,930 | B1 | 5/2005 | Hartselle et al. | 379/88.22 |
| 6,940,958 | B2 | 9/2005 | Clapper | 379/142.01 |
| 6,987,841 | B1 | 1/2006 | Byers et al. | 379/88.14 |
| 2001/0027097 | A1 | 10/2001 | I'Anson | 455/413 |
| 2002/0031207 | A1 * | 3/2002 | Lin | 379/88.17 |
| 2002/0069060 | A1 | 6/2002 | Cannavo et al. | 704/257 |
| 2002/0077082 | A1 | 6/2002 | Cruickshank | 455/413 |
| 2002/0131566 | A1 | 9/2002 | Stark et al. | 379/88.19 |
| 2002/0143885 | A1 | 10/2002 | Ross, Jr. | 709/207 |
| 2002/0147592 | A1 | 10/2002 | Wilmont et al. | 704/270.1 |
| 2002/0159572 | A1 | 10/2002 | Fostick | 379/88.14 |
| 2003/0018720 | A1 | 1/2003 | Chang et al. | 709/206 |
| 2003/0039342 | A1 | 2/2003 | Yafuso | 379/88.19 |
| 2003/0078035 | A1 | 4/2003 | Sheha et al. | 455/414 |
| 2003/0119486 | A1 * | 6/2003 | Tari et al. | 455/412 |
| 2003/0135647 | A1 | 7/2003 | Himmel et al. | 709/245 |
| 2003/0140090 | A1 * | 7/2003 | Rezvani et al. | 709/203 |
| 2003/0140091 | A1 | 7/2003 | Himmel et al. | 709/203 |
| 2003/0142799 | A1 | 7/2003 | Candell et al. | 379/88.13 |

OTHER PUBLICATIONS

U.S. Official Action dated Jan. 24, 2005 in U.S. Appl. No. 10/022,941.

Office Action issued on U.S. Appl. No. 10/109,975, filed Aug. 25, 2004.

Office Action issued on U.S. Appl. No. 10/178,276, filed Oct. 1, 2004.

U.S. Appl. No. 10/852,600, entitled "Saving Information from Information Retrieval Systems," filed May 24, 2004, Inventors: La Veria Baker, Vernon Meadows & David Scott.

U.S. Appl. No. 10/028,618, filed Dec. 20, 2001, entitled "Delivery of Wireless Messages to Wireline Interactive Devices", Inventors: Simpson.

U.S. Appl. No. 10/178,276, filed Jun. 24, 2002, entitled "Saving and Forwarding Customized Messages", Inventors: Roberts et al.

U.S. Appl. No. 10/022,941, filed Dec. 17, 2001, entitled "Method and System for Call, Facsimile and Electronic Message Forwarding", Inventors: Moore et al.

U.S. Appl. No. 10/109,975, filed Mar. 29, 2002, entitled "Transferring Voice Mail Messages in Text Format", Inventors: Eason.

U.S. Appl. No. 10/112,663, filed Mar. 29, 2002, entitled "Saving Information from Information Retrieval Systems", Inventors: Hartselle et al.

U.S. Appl. No. 10/180,149, filed Jun. 26, 2002, entitled "Categorization of Messages Saved on a Network-Based Voicemail System", Inventors: Baker et al.

U.S. Appl. No. 10/180,167, filed Jun. 26, 2002, entitled "Voicemail Box with Caller-Specific Storage Folders", Inventors: Baker et al.

U.S. Appl. No. 10/180,261, filed Jun. 26, 2002, entitled "Voicemail System with Subscriber Specific Storage Folders", Inventors: Baker et al.

U.S. Official Action dated Jul. 14, 2005 cited in U.S. Appl. No. 10/180,167.

U.S. Official Action dated Jul. 18, 2005 cited in U.S. Appl. No. 10/180,261.

U.S. Official Action dated Oct. 20, 2005 cited in U.S. Appl. No. 10/852,600.

U.S. Official Action dated Dec. 16, 2005, cited in U.S. Appl. No. 10/109,975.

U.S. Final Official Action dated Jan. 11, 2006 cited in U.S. Appl. No. 10/180,167.

U.S. Final Official Action dated Apr. 20, 2006 cited in U.S. Appl. No. 10/852,600.

U.S. Final Official Action dated May 22, 2006 cited in U.S. Appl. No. 10/028,618.

U.S. Official Action dated Jul. 14, 2006 cited in U.S. Appl. No. 10/109,975.

U.S. Official Action dated Jul. 11, 2006 cited in U.S. Appl. No. 10/180,167.

U.S. Official Action dated Oct. 17, 2006 cited in U.S. Appl. No. 10/852,600.

U.S. Official Action dated Oct. 4, 2005 cited in U.S. Appl. No. 10/028,618.

U.S. Official Action dated May 3, 2005 in U.S. Appl. No. 10/109,975.

U.S. Official Action dated May 18, 2005 in U.S. Appl. No. 10/178,276.

* cited by examiner

US 7,190,950 B1

STORAGE OF VOICEMAIL MESSAGES AT AN ALTERNATE STORAGE LOCATION

FIELD OF THE INVENTION

This invention relates to a method and system for storing voicemail messages at an alternate storage location.

BACKGROUND OF THE INVENTION

In modern telecommunications systems, network-based voicemail systems provide subscribers the ability to receive and review saved voice messages left by calling parties when the subscriber's telephone is busy or is unanswered. In a typical voicemail system, subscribers are allowed a set amount of storage space for saving voicemail messages. Once the storage space taken up by voicemail messages saved in the subscriber's voicemail box meets or exceeds the limited amount of memory space allowed by the voicemail system, voice messages are often deleted by the voicemail system. Typically, prior to deleting voicemail messages the voicemail system will provide a reminder prompt to the subscriber that the subscriber has too many voicemail messages and that they will be deleted within a set amount of time. Many voicemail services subscribers use the voicemail system as a repository for stored voicemail messages that contain information or data that is important to the subscriber and that the subscriber would like to maintain for future use.

Accordingly, there is a need for a method and system for storing voicemail messages to an alternate storage location where voicemail messages may be saved for an extended period of time as prescribed by the subscriber of the voicemail services. It is with respect to these and other considerations that the present invention has been made.

SUMMARY OF THE INVENTION

Embodiments of the present invention are directed to a method and system for storing received voicemail messages to alternate storage locations. A subscriber to voicemail services of a telecommunications network-based voicemail system provides the voicemail system with an address or a number of addresses to which the subscriber may forward received voicemail messages for extended storage. For example, the subscriber may provide an electronic mail address, facsimile device number, a forwarding telephone directory number, or the address of a wireless electronic device, such as a hand-held computer, personal digital assistant, or pager.

After receiving and reviewing a voicemail message left for the subscriber at her voicemail system, the subscriber may select an alternate storage address to have the voicemail message forwarded to that address for extended storage and for subsequent review and use. The voicemail message may be forwarded in its received analog audio format to a forwarding telephone directory number at which it may be recorded by a separate voicemail system, or the message may be converted from speech-to-text at the voicemail system prior to forwarding the message. If the message is converted to text format, the message may be sent to a forwarding facsimile device, or the message may be electronically mailed to an email address, Internet-based web page, or wireless electronic device. Alternatively, the message may be converted to a digital audio format and may be electronically mailed as an attachment to an electronic mail message to an address provided by the subscriber. Once the message is sent to the alternate storage location, as prescribed by the subscriber, the message may be saved for a length of time and in a format as dictated by the subscriber.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention as claimed.

DETAILED DESCRIPTION

The following description of an embodiment of the present invention is made with reference to the above-described drawings wherein like numerals refer to like parts or components throughout the several figures. The present invention is directed to a method and system for storing voicemail messages at an alternate storage location.

Operating Environment

Figure 1:
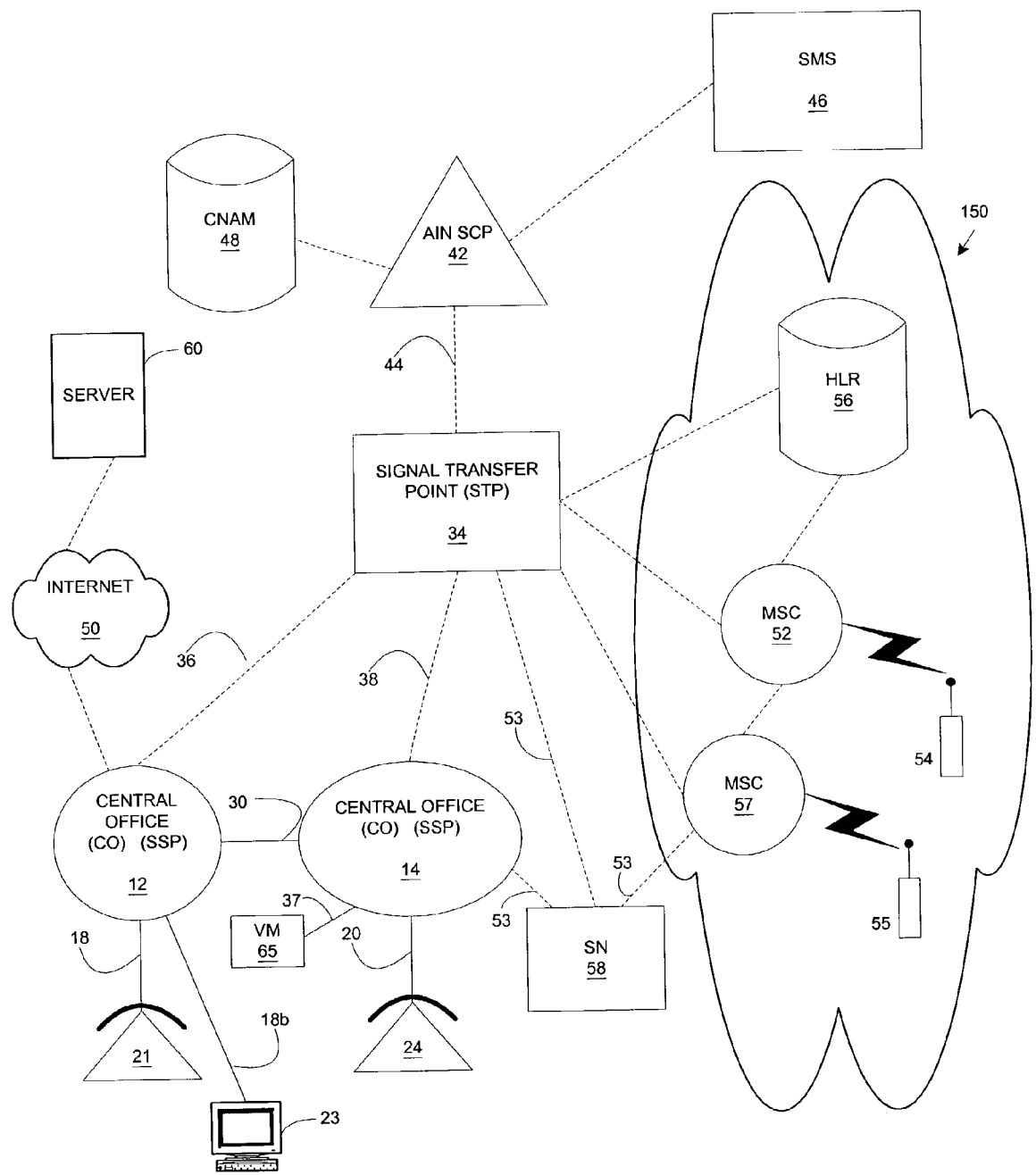
FIG. 1 is a simplified block diagram illustrating components of a wireline and wireless telecommunications network that provides an operating environment for the present invention.

FIG. 1 is a block diagram illustrating components of a wireline and wireless telephone network that provides an exemplary operating environment for the present invention. The public switched telephone network that evolved in the 1980s incorporated the advanced intelligent network (AIN). Some of the components of the advanced intelligent network are illustrated in FIG. 1. FIG. 1 is illustrative of at least a part of the advanced intelligent network (AIN) of a typical local exchange carrier integrated with components of a wireless network 150. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices are provided in a typical public switched telephone network. As shown in FIG. 1, each central office may include an electronic switch known to those skilled in the art as a service switching point (SSP). These are indicated in FIG. 1 as SSP switches 12 and 14. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as the trunk circuit 30.

As shown in FIG. 1, switches (SSP) 12 and 14 have a plurality of subscriber lines 18 and 20 connected thereto. Each of the subscriber lines 18 and 20 is connected to a terminating piece or pieces of customer premises equipment that are represented by telephones 21 and 24. A computer 23 also is illustrated as connected to the switch 12 via the subscriber line 18(b). The computer 23 is illustrative of a single or a plurality of computing and data storage devices. SSP switches 12 and 14 are connected by a plurality of trunk circuits 30. These are the voice path trunks that interconnect the central offices 12 and 14 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 1.

Much of the intelligence, and the basis for many of the enhanced features of the network, resides in the local service control point (SCP) 42 that is connected to signal transfer point 34 via SS7 data link 44. As is known to those skilled in the art, service control points, such as the SCP 42, are physically implemented by relatively powerful fault tolerant computers. Among the functions performed by the service control points is maintenance of network databases used in providing enhanced services. Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber.

Additional devices for implementing advanced network functions within the AIN are provided by regional STPs (not shown) and regional SCPs (not shown). The STP 34 is connected to the SSPs via connections 36 and 38. Both the regional SCPs and the local SCP 42, which represent a plurality of local SCPs distributed throughout the AIN, are connected via respective data links to the SMS 46. The SMS 46 provides a centralized platform for remotely programming the various SCPs of the AIN so that a coordinated information processing scheme may be implemented for the AIN.

The modern Advanced Intelligent Network also includes service nodes (SN) such as the service node 58. Those skilled in the art are familiar with service nodes, which are physically implemented by the same types of computers that embody the SCP 42. In addition to the computing capability and data base maintenance features, service nodes 58 use ISDN lines and may include DTMF signal recognition devices, tone generation devices, text to speech (TTS) voice synthesis devices and other voice or data resources. As shown in FIG. 1, the connection is through the SSP. For example, SN 55 is connected to SCP 42 via ISDN links 53 to SSP 12, ISDN/SS7 protocol conversion in SSP 12, and SS7 links 38 and 44. According to a preferred embodiment, the ISDN links 53 as a primary rate interface (PRI) over which services may be provided to subscribers using wireline services such as the wireline telephone sets 21 and 24 and subscribers using wireless services such as the wireless units 54 and 55.

The voice mail system 65 is shown in FIG. 1 being functionally connected to the switch 14 and is a component of the network. That is, calls are routed to and from the voice mail system 65 at the control and direction of the network via such components as the SCP 42. The voice mail system 65 may be connected to the switch 14 via a PRI interface line 37 similar to the connection of the service node 58 to the switch 14. In operation, the voice mail system 65 is treated like a switch 14 whereby calls directed to voice mail boxes maintained at the voice mail system 65 are directed to the voice mail system 65 as calls are directed to customer premises equipment, such as telephones, via switches 12, 14.

The voice mail system 65 typically includes a computer or collection of computers, recording and recording playback devices, and software for recording announcements for incoming calls, recording and playing back recorded messages, and for receiving incoming calls and for making outgoing calls at the direction of the network. In addition to the recording and playback functionality, the voice mail system 65 includes text-to-speech (TTS) and speech-to-text (STT) synthesis devices and software for conversion of analog voice messages to digitized forms such as WAV files and MP3 files. The voice mail system 65 has memory capacity for saving announcements to incoming callers and for saving messages from incoming callers. The computing system of the voice mail system 65 also includes an electronic mail server that may send and receive electronic mail via the network and the Internet 50.

The Internet 50 is well known to those skilled in the art as essentially a packet-switched network based on the family of protocols called Transmission Control Protocol/Internet Protocol (TCP/IP), a family of networking protocols providing communication across interconnected networks between computers with diverse hardware architectures and between various computer operating systems. Operation of the Internet 50 and the TCP/IP transmission protocols is well known to those skilled in the art.

The server 60 is illustrative of a computing system accessible via a distributed computing environment such as the Internet 50. The server 60 may include a computer or collection of computers along with associated software applications and memory capacity. The server 60 may serve as an Internet web server for maintaining and administering Internet web pages serving as an access point to the functionality of the present invention via the computer 23. For example, a user may use the computer 23 to access the functionality of the present invention by accessing an Internet web page maintained at the server 60 and operated by the provider of the functionality.

The wireless network 150, such as a cellular network, comprises a mobile switching centers (MSC) 52 and 57. The MSC 52 is a switch providing services and coordination between wireless users in the network 150 and external networks. The MSC 52 may be connected to the STP 34 to provide information to the wireline network and receive information from the wireline network. The MSC 52 also communicates with a wireless subscriber, such as wireless telephones 54 and 55. The wireless telephones 54 and 55 are also illustrative of other wireless computing devices, such as pagers and personal digital assistants.

In operation, the intelligent network elements of the AIN, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP switches 12 and 14, a relatively small set of triggers are defined at the SSP switches for each call.

The message created by an SSP in response to the "firing" of a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP to route the held communication for connection with a terminating station. Query messages, conversation messages, and response messages are standard types of messages defined by the AIN protocol. The details of the AIN protocol are well known to those skilled in the art and will not be further described herein. For more information regarding the AIN protocol, see Bellcore Specification GR-1298-CORE Switching Systems Generic Requirements for AIN 0.1, which is incorporated herein by reference.

Operation

Having described an operating environment for the present invention with reference to FIG. 1, the following is a description of a logical flow of the steps performed by a method and system of the present invention for providing alternate storage location instructions to a voicemail system in accordance with the present invention. The method 200 begins at start step 205 and proceeds to step 210 where the subscriber contacts the voicemail system 65 to provide the voicemail system 65 with one or more alternate storage locations to which the subscriber would like to forward received voicemail messages for extended storage at the direction of the subscriber.

At step 215, the subscriber provides the voicemail system 65 a number of alternate storage addresses including an electronic mail address, a facsimile device address, a forwarding telephone directory number address, or the address of a wireless electronic device, such as a hand-held computer, personal digital assistant or pager. The subscriber may enter the addresses for alternate voice message storage by speaking the information into the subscriber's telephone handset to a voice recognition system operated by the voicemail system 65.

Alternatively, the subscriber may enter the required alternate storage location addresses using the keypad on the user's telephone handset 21. Alternatively, the subscriber may contact the voicemail system 65 and enter the addresses of the alternate storage locations using an Internet-based web page operated by the voicemail system provider. Referring to FIG. 1, the subscriber using her computer 23 via the Internet 50 may open an Internet-based web page from the server 60 operated by the telecommunications service provider of the voicemail system 65. Using the Internet-based web page, the subscriber may enter the addresses of alternate storage locations to which the subscriber may wish to forward voice messages for storage.

Referring back to FIG. 2, at step 220, the subscriber may enter an electronic mail address to which voice messages may be forwarded. The electronic mail address may be an electronic mail address at the subscriber's computer 23, or the electronic mail address may be an address of a memory location maintained at a remote server 60. Alternatively, the electronic mail address may be the address of an Internet-based web page operated by the service provider of the voicemail system 65 where messages may be forwarded and stored indefinitely at the direction of the subscriber. Under this aspect of the invention, the subscriber may open the Internet-based web page to open and review voice messages forwarded to that location and stored. As should be understood by those skilled in the art, a personal identification number (PIN) may be assigned to the subscriber's designated memory location at the server 60 to allow the subscriber access to her memory location via the Internet-based web page.

At step 225, the subscriber may enter a telephone directory number associated with a facsimile device to which the subscriber may forward voice messages received at the voicemail system 65. At step 230, the subscriber may enter a forwarding telephone directory number to which the subscriber may forward voice messages received at the voicemail system 65. For example, if the voicemail system 65 has alerted the subscriber that her messages have exceeded the allowed number of messages and that some of her messages may be deleted, the subscriber may wish to simply forward some of those messages to a forwarding telephone directory number at which a separate voicemail system will receive those forwarded voice messages and store them for subsequent use by the subscriber. At step 235, the subscriber may enter the address of a variety of wireless electronic devices, including wireless hand-held computers, personal digital assistants, or pagers for receipt of voice messages via the wireless telecommunications system 150, illustrated in FIG. 1.

At step 240, the subscriber may enter via the voicemail system 65 or via the Internet-based web page of the provider of the voicemail system 65 instructions for alternate storage of voice messages received by the subscriber. At step 245, the subscriber may enter an instruction that voice messages are only to be forwarded to one of the prescribed alternate storage locations upon command by the subscriber. That is, when the subscriber listens to a voice message from the voicemail system 65, the subscriber may be provided with a prompt allowing the subscriber to instruct the voicemail system to forward the voice message to one of a number of alternate storage locations set up by the subscriber in one of steps 220, 225, 230 or 235.

At step 250, the subscriber may instruct the voicemail system to automatically send saved voice messages to one of the alternate storage locations after a set number of days after receipt of the voice message at the voicemail system 65. This aspect of the present invention is useful for voicemail systems that automatically delete voice messages that have been stored more than a set number of days. At step 255, the subscriber may instruct the voicemail system 65 to save voice messages to an alternate storage location upon receipt. That is, as soon as a voice message is deposited in the subscriber's voicemail box at the voicemail system 65 by a calling party, that message is simultaneously forwarded to an alternate storage location prescribed by the subscriber. The method then ends at step 290.

Figure 3:
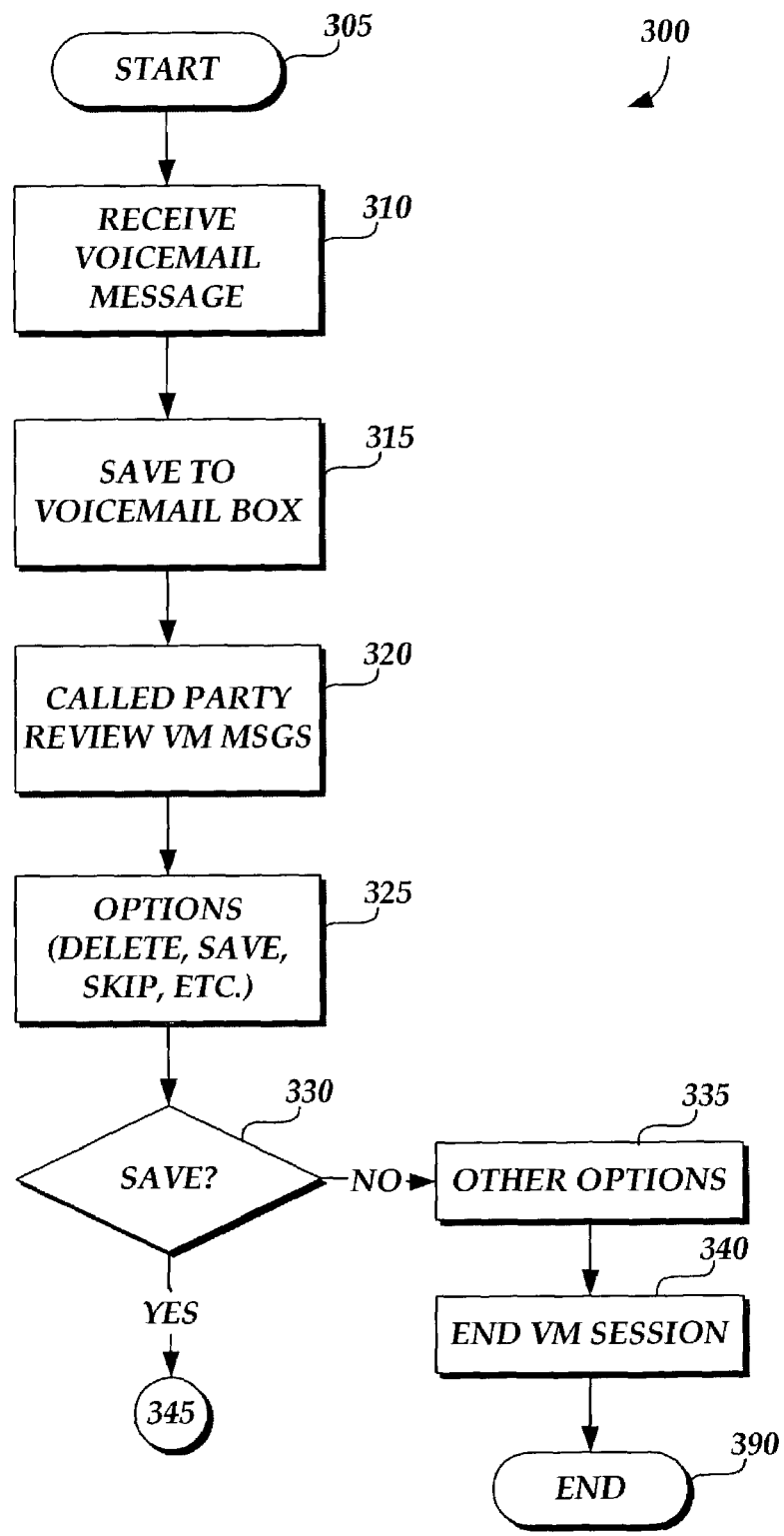
FIGS. 3 and 4 illustrate a logical flow of the steps performed by a method and system of the present invention for receiving, reviewing and forwarding to an alternate storage location voice messages received by a subscriber of voicemail services according to an embodiment of the present invention.
Figure 4:
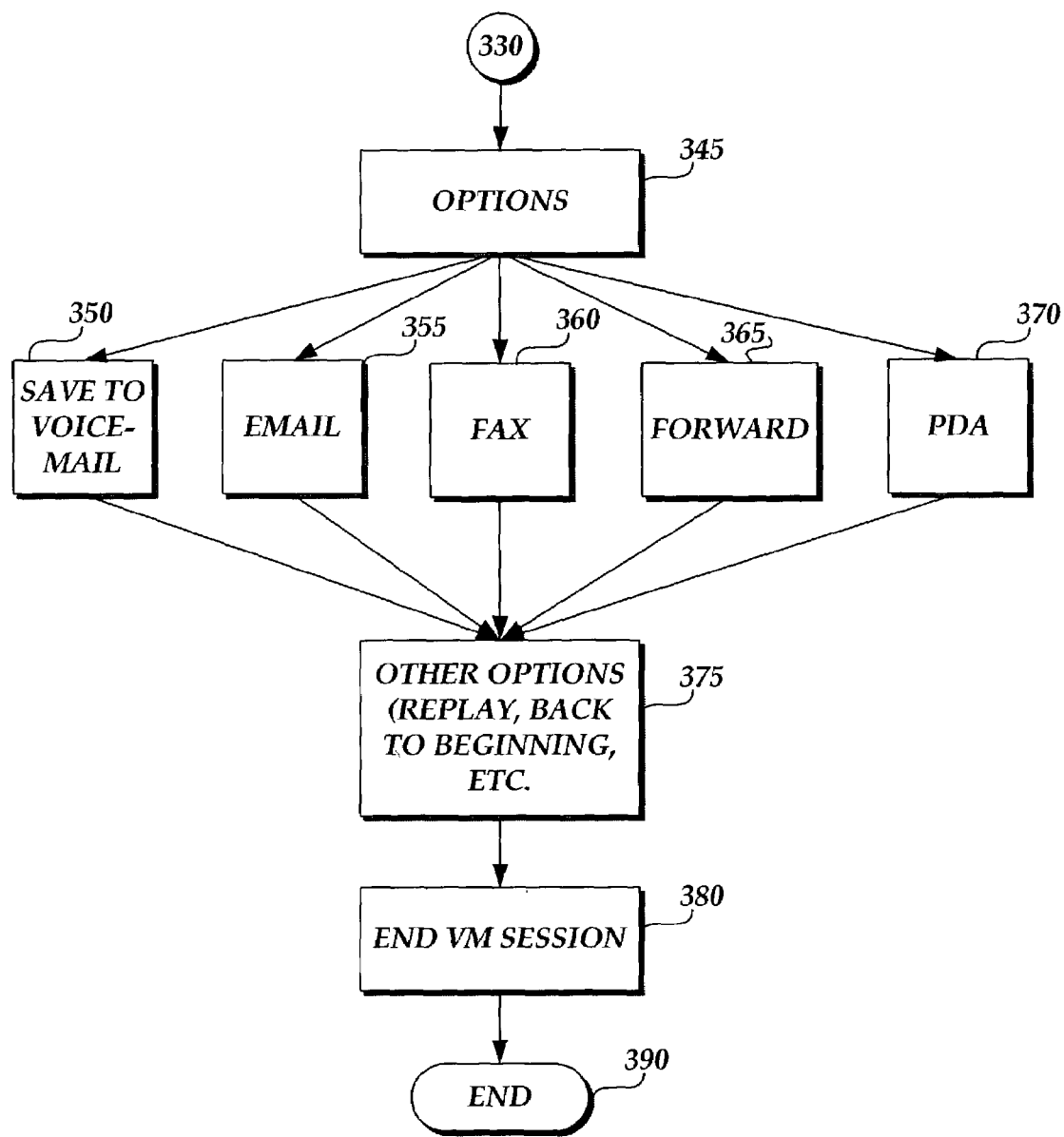

FIGS. 3 and 4 illustrate a logical flow of the steps performed by a method and system of the present invention for receiving, reviewing and forwarding to an alternate storage location voice messages received by a subscriber of voicemail services according to an embodiment of the present invention. The method 300 begins at start step 305 and proceeds to step 310 where a voicemail message is received at the subscriber's voicemail box at the voicemail system 65. In order to receive the voicemail message at the voicemail system 65, the calling party places a call to the subscriber or called party at the subscriber switch 12 and receives an indication that the subscriber's line 18 is busy or receives indication that the call will not be answered because a prescribed number of rings has been exceeded. Once the indication that the call will not be answered is received at the switch 12, the call from the calling party is routed to the voicemail system 65 so that the calling party may provide a voice message to the subscriber at the subscriber's voicemail box. At step 315, the voice message left by the calling party is saved at the voicemail system 65.

At step 320, the subscriber or called party enters the voicemail system 65 to review voicemail messages left by calling parties. At step 325, a number of options are provided to the subscriber such as the options of saving, deleting, skipping, or forwarding the saved voice messages. At step 330, a determination is made as to whether the subscriber would like to save a voice message after reviewing the message. If not, the method proceeds to step 335 and other options are provided to the subscriber such as the options to delete the message or to hear the message again. At step 340 the voicemail session is ended and the method ends at step 390.

Referring back to step 330, if the subscriber elects to save the voice message, the method proceeds to step 345 and a number of saving options are provided to the subscriber. For example, the subscriber may be provided with a prompt from the voicemail system 65 such as "press 1 to save this message to your mailbox; press 2 to e-mail this message; press 3 to fax this message; press 4 to forward this message to a forwarding directory number; or press 5 to forward this message to your personal digital assistant." If the subscriber decides to simply save the message at her voicemail box at the voicemail system 65, the method proceeds to step 350 and the message is saved at the voicemail system 65. The method then proceeds to step 375 and other options are provided such as replay the message, move back to the beginning of saved messages, etc.

At step 345, if the subscriber elects to e-mail the received voice message to an e-mail address previously entered into the voicemail system 65, the method proceeds to step 355. At step 355, the voice message received by the subscriber may be converted from speech-to-text by a speech-to-text synthesis device operated at the voicemail system 65. The text version of the voice message is then loaded into an electronic mail format via the electronic mail server located at the voicemail system 65 and is electronically mailed to the e-mail address prescribed by the subscriber. Alternatively, the voice message received by the subscriber may be converted to a digital audio format such as .WAV or .MP3, and the digital formatted audio message may then be attached to an electronic mail message and forwarded to the electronic mail message provided by the subscriber.

If the subscriber elects to have the voice message forwarded to a facsimile device for receipt by the subscriber at an alternate location, the voice message is converted to a text message, as described above, and the text message is forwarded to the telephone directory number of the facsimile device provided by the subscriber. If the subscriber elects to have the voice message forwarded to a forwarding telephone directory number, the voicemail system forwards the voice message received by the subscriber to the forwarding telephone directory number in a manner well known to those skilled in the art. As described above, the subscriber may have a separate voicemail system or device at a forwarding telephone directory number at which she may receive voice messages that are to be deleted by the voicemail system 65 after a set period of time or upon command by the subscriber.

If the subscriber elects to forward the received voice messages to a wireless electronic device, such a wireless handheld computer or a personal digital assistant, the method proceeds to step 370, and the voice message is converted to text format or to a digital audio format. The text-formatted or digital audio-formatted message is then forwarded to the address of the wireless electronic device provided by the subscriber. After any received voice message is forwarded, as described with reference to steps 355, 360, 365, or 370, the method proceeds to step 375. Then the voicemail session ends at step 380 and the method proceeds to step 390, as described above.

Figure 2:
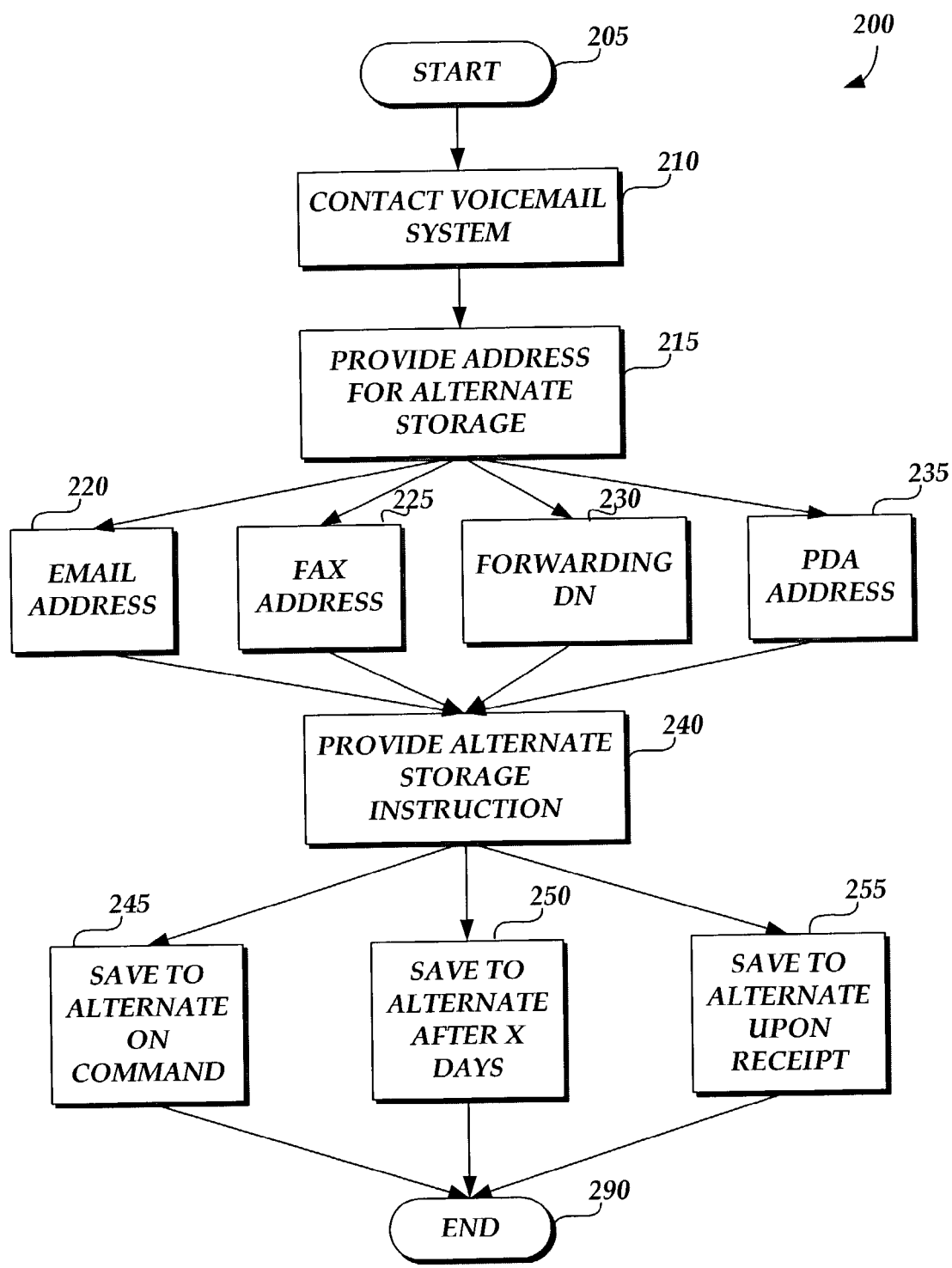
FIG. 2 illustrates a logical flow of the steps performed by a method and system of the present invention for providing alternate storage location instructions to a voicemail system in accordance with the present invention.

Description of steps 350, 355, 360, 365, and 370 above are in reference to an instruction by the subscriber to save voice messages to an alternate location on command as discussed with reference to step 245 of FIG. 2. However, as described above, the subscriber may elect to have voice messages saved at the voicemail system 65 forwarded to the prescribed alternate storage location after a set period or automatically upon receipt. In either of these cases, the subscriber will not be required to select any of the options described with respect to steps 355, 360, 365, and 370 because the voice messages received by the subscriber will be forwarded to a prescribed alternate storage location according to instructions entered by the subscriber.

As described, a method and system are provided for forwarding and storing voice messages received at a subscriber's voicemail system to an alternate storage location prescribed by the subscriber so that the subscriber may maintain received voice messages in an extended storage location for subsequent review and use by the subscriber. It will be apparent to those skilled in the art that various modifications and variations may be made in the present invention without departing from the scope or spirit of the invention. Other embodiments of the invention will be apparent to those skilled in the art from consideration of the specification and practice of the invention disclosed herein.

We claim:

1. A method of storing voice messages received at a network-based voicemail system to an alternate storage location, comprising:

receiving at the voicemail system a forwarding address for forwarding voice messages to an alternate storage location;

receiving forwarding instructions for forwarding voice messages to the alternate storage location;

receiving a voice message from a calling party at a subscriber voicemail box at the voicemail system, the voicemail system configured to delete the voice message after a predetermined time period;

determining whether the voice message is to be forwarded to the alternate storage location based upon input provided by a voicemail service subscriber, the input indicating one of the following: that the voice message is to be forwarded to the alternate storage location after a first defined time period and that the voice message is to be forwarded to the alternate storage location upon receipt at the subscriber voicemail box;

forwarding the voice message to the alternate storage location; and wherein the voice message is saved at the alternate storage location for a second defined time period, the second defined time period being defined by the voicemail service subscriber.

2. The method of claim 1, prior to receiving at the voicemail system a forwarding address for forwarding voice messages to an alternate storage location, further comprising the step of contacting the voicemail system telephonically for providing the forwarding address and forwarding instructions for forwarding the voicemail messages.

3. The method of claim 1, prior to receiving at the voicemail system a forward addresses for forwarding voicemail messages to an alternate storage location, further comprising contacting the voicemail system via an internet-based web page for providing the voicemail system with a forwarding address and forwarding instructions.

4. The method of claim 1, whereby receiving at the voicemail system with a forwarding address further comprises receiving at the voicemail system an electronic mail address for forwarding voice messages to the alternate storage location.

5. The method of claim 4, whereby the electronic mail address includes an electronic mail address associated with a computing system of the subscriber.

6. The method of claim 4, whereby the electronic mail address is associated with an Internet-based web page from which the subscriber may receive and review alternatively stored voice messages.

7. The method of claim 1, whereby receiving at the voicemail system a forwarding address for forwarding voice message to an alternate storage location further comprises receiving at the voicemail system a facsimile device directory number.

8. The method of claim 1, whereby receiving at the voicemail system a forwarding address for forwarding the voice messages to an alternate storage location, further comprises receiving at the voicemail system a forwarding telephone directory number at which the voice message may be saved to an alternate voice message system.

9. The method of claim 1, whereby receiving at the voicemail system a forwarding address for forwarding the voice messages to an alternate storage location, further comprises receiving at the voice message system an electronic mail address on a wireless electronic device.

10. The method of claim 9, whereby the wireless electronic device includes a wireless hand-held computer.

11. The method of claim 9, whereby the wireless electronic device includes a wireless personal digital assistant.

12. The method of claim 9, whereby the wireless electronic device includes a wireless pager.

13. The method of claim 1, whereby receiving forwarding instructions for forwarding voice messages to an alternate storage location, further comprises instructing the voicemail system to allow the subscriber to forward voice messages to an alternate storage location upon command from the subscriber.

14. The method of claim 1, whereby receiving forwarding instructions for forwarding voice messages to an alternate storage location, further comprises instructing the voicemail system to forward messages to the alternate storage location after a set period of time has elapsed.

15. The method of claim 1, whereby receiving forwarding instructions for forwarding voice messages to the alternate storage location, further comprises instructing the voicemail system to forward voice messages to the alternate storage location upon receipt of the voice messages at the voicemail system.

16. The method of claim 1, whereby determining whether the voice message is to be forwarded to an alternate storage location, further comprises searching at the voicemail system for the forwarding instructions for forwarding voice messages to an alternate storage location.

17. The method of claim 16, further comprising prompting the subscriber for a command for forwarding the voice message to the alternate storage location.

18. The method of claim 4, whereby forwarding the voice message to the alternate storage location, further comprises forwarding the voice message to the alternate storage location via the electronic mail address.

19. The method of claim 18, prior to forwarding the voice message to the alternate storage location via the electronic mail address, converting the voice message from a speech format to a text format; and at the voicemail system, inserting the text format voice message in an electronic mail message for forwarding to the alternate storage location via the electronic mail address.

20. The method of claim 18, prior to forwarding the voice message to the alternate storage location via the electronic mail address, further comprising:

converting the voice message to a digital audio format message; and attaching the digital audio format message to an electronic mail message for forwarding to the alternate storage location via the electronic mail address.

21. The method of claim 7, whereby forwarding the voice message to the alternate storage location further comprises:

converting the voice message from a speech format to a text format; and forwarding the text format message to the facsimile device directory number.

22. The method of claim 8, whereby forwarding the voice message to the alternate storage location further comprises:

forwarding the voice message to the forwarding telephone directory number; and receiving the forwarded voice message at the alternate voicemail system.

23. The method of claim 9, whereby forwarding the voice message to the alternate storage location, further comprises forwarding the voicemail message to the wireless electronic device.

24. The method of claim 23, prior to forwarding the voice message to the wireless electronic device, further comprising:

converting the voice message from a speech format message to a text format message; and inserting the text format message in an electronic mail message for forwarding to the wireless electronic device via the electronic mail address.

25. The method of claim 24, prior to forwarding the voice message to the wireless electronic device, further:
- converting the voice message to a digital audio format message; and
- attaching the digital audio format message to an electronic mail address for forwarding to the wireless electronic device via the electronic mail address.

26. A voice mail system for storing voice messages received at a network-based voicemail system to an alternate storage location, comprising:
- means for receiving a forwarding address for forwarding voice messages to an alternate storage location;
- means for receiving forwarding instructions for forwarding voice messages to the alternate storage location;
- means for receiving a voice message from a calling part at a subscriber voicemail box at the voicemail system, the voicemail system configured to delete the voice message after a predetermined time period;
- means for determining whether the voice message is to be forwarded to the alternate storage location based upon input provided by a voicemail service subscriber, the input indicating one of the following: that the voice message is to be forwarded to the alternate storage location after a first defined time period and that the voice message is to be forwarded to the alternate storage location upon receipt at the subscriber voicemail box;
- means for forwarding the voice message to the alternate storage location based on the forwarding instructions and forwarding address; and
- wherein the voice message is saved at the alternate storage location for a second defined time period, the second defined time period being defined by the voicemail service subscriber.

27. The system of claim 26, the voicemail system including an electronic mail server operative to forward the voice message to an electronic mail address.

28. The system of claim 27, whereby the electronic mail address includes an electronic mail address associated with a computing system of the subscriber.

29. The system of claim 27, whereby the electronic mail address is associated with an Internet-based web page from which a forwarded voice message may be retrieved and reviewed.

30. The system of claim 27, whereby the electronic mail address includes an electronic mail address associated with a wireless electronic device.

31. The system of claim 26, whereby the voicemail system is further operative to forward the voice message to a facsimile device directory number.

32. The system of claim 26, whereby the voicemail system is further operative to forward the voice message to a forwarding telephone directory number.

33. The system of claim 26, whereby the voicemail system is further operative
- to convert the voice message from a speech format to a text format; and
- to insert the text format voice message in an electronic mail message for forwarding to the alternate storage location via an electronic mail address.

34. The system of claim 26, whereby the voicemail system is further operative
- to convert the voice message to a digital audio format message; and
- to attach the digital audio format message to an electronic mail message for forwarding to the alternate storage location via an electronic mail address.

35. A computer-readable medium which stores a set of instructions which when executed performs a method for storing voice messages received at a network-based voicemail system to an alternate storage location, the method executed by the set of instructions comprising:
- receiving at the voicemail system a forwarding address for forwarding voice messages to an alternate storage location;
- receiving forwarding instructions for forwarding voice messages to the alternate storage location;
- receiving a voice message from a calling party at a subscriber voicemail box at the voicemail system, the voicemail system configured to delete the voice message after a predetermined time period;
- determining whether the voice message is to be forwarded to the alternate storage location based upon input provided by a voicemail service subscriber, the input indicating one of the following: that the voice message is to be forwarded to the alternate storage location after a first defined time period and that the voice message is to be forwarded to the alternate storage location upon receipt at the subscriber voicemail box:
- forwarding the voice message to the alternate storage location; and
- wherein the voice message is saved at the alternate storage location for a second defined time period, the second defined time period being defined by the voicemail service subscriber.

\* \* \* \* \*